United States Patent [19]

Nissl

[11] 4,083,254
[45] Apr. 11, 1978

[54] ACCELEROMETER

[75] Inventor: Norbert Nissl, Aresing, Germany

[73] Assignee: Messerschmitt-Boelkow-Blohm GmbH Gesellschaft mit beschraenkter Haftung, Munich, Germany

[21] Appl. No.: 793,939

[22] Filed: May 5, 1977

[30] Foreign Application Priority Data

May 12, 1976 Germany .............................. 2620914

[51] Int. Cl.$^2$ .......................................... G01P 15/08
[52] U.S. Cl. .................................. 73/517 R; 350/285
[58] Field of Search ............ 73/517 R, 517 B, 516 R, 73/71.1, 71.3; 350/160 R, 285

[56] References Cited

U.S. PATENT DOCUMENTS

| | | | |
|---|---|---|---|
| 2,565,514 | 8/1951 | Pajes | 350/285 |
| 3,443,098 | 5/1969 | Lewis | 350/160 R |

Primary Examiner—James J. Gill
Attorney, Agent, or Firm—W. G. Fasse; W. W. Roberts

[57] ABSTRACT

The present accelerometer uses the total light reflection of a prism for measuring an acceleration force by disturbing such total reflection in accordance with the displacement or deflection of a body located close to a boundary surface of said prism, and responsive to the movement of an inertia mass which in turn responds to the acceleration force. The reflected light is measured by a photosensitive device and the resulting electrical signal is a direct measure for the size of the acceleration force. In order to make the measuring of the acceleration force independent of variations in the intensity of the light emitted by a light source used as part of the accelerometer, a reference signal may also be produced to form a quotient of the measured signal and the reference signal.

9 Claims, 3 Drawing Figures

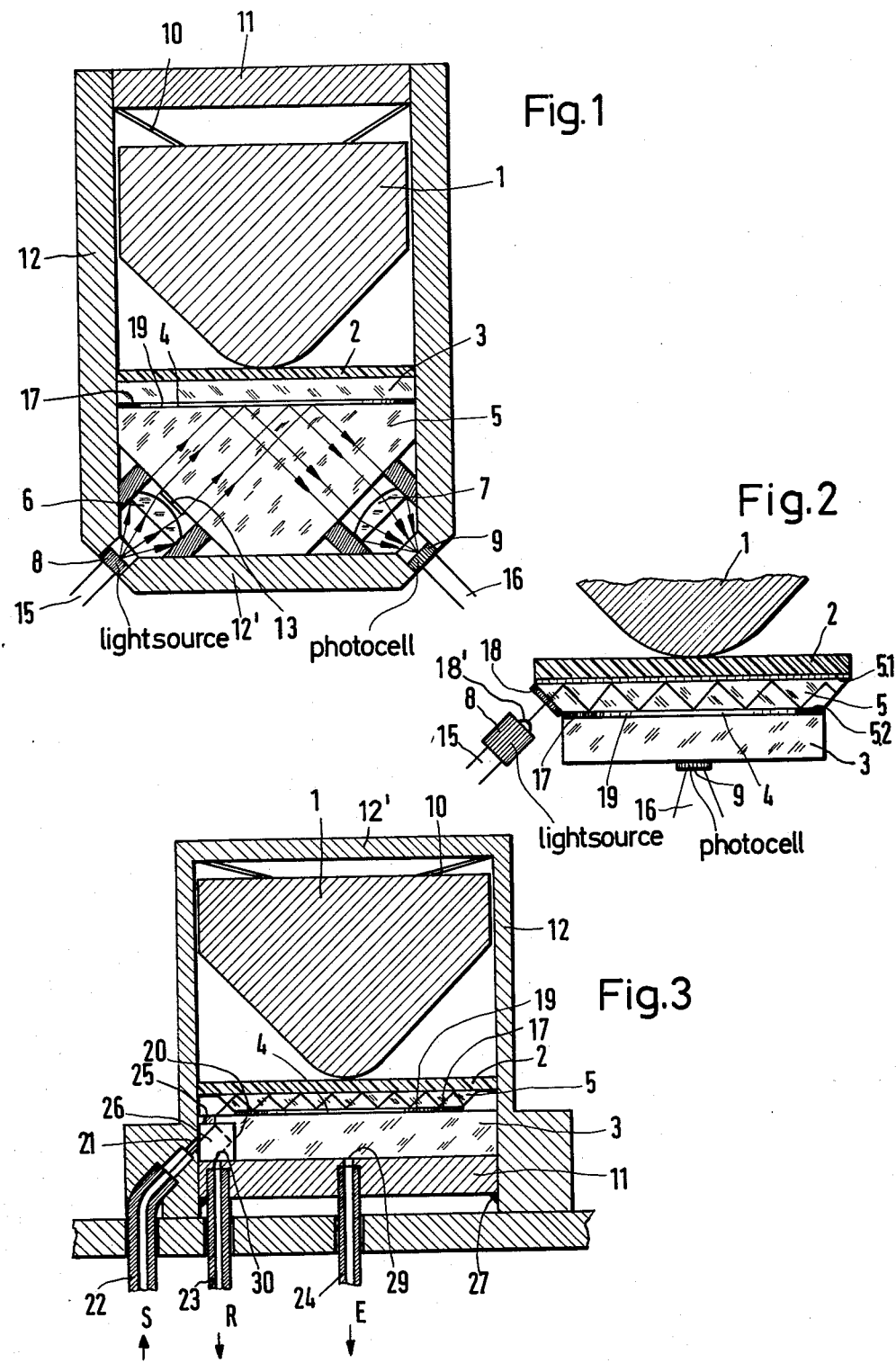

ACCELEROMETER

BACKGROUND OF THE INVENTION

The present invention relates to an accelerometer wherein an inertia mass is responsive to the acceleration force, and wherein a device is arranged for measuring of a force which is effective on said inertia mass. Prior art accelerometers of this type employ piezoelectric elements on which the inertia force is effective in response to an acceleration force. The resulting piezoelectric load or signal is measured and constitutes an indication of the size of the acceleration force that occurs. Such accelerometers are, for instance, used in electrical fuses or detonators of shells or in protection systems of motor vehicles, for example, for filling an air bag or for tightening seat belts or shoulder belts. For all these purposes it is essential that the acceleration sensing remains reliably operable over prolonged periods of time. However, it has been found, that conventional piezoelectric ceramic materials have irregular or erratic and uncontrollable characteristics as a result of temperature or aging influences.

OBJECTS OF THE INVENTION

In view of the foregoing, it is the aim of the invention to achieve the following objects, singly or in combination:

to provide an accelerometer which is economical in its production and which has a response characteristic which is substantially independent of the environmental temperature and/or of aging influences;

to construct an accelerometer which employs for its function the Goos-Haehnchen effect;

to modulate the light reflected in an optically denser medium by means of the elastic deflections or displacements of a body which is responsive to the acceleration forces and which is arranged close to a boundary surface of the optically denser medium;

to employ in an accelerometer, optical and mechanical elements which are substantially insensitive against aging and temperature variations as compared to piezoelectric elements of the prior art; and to avoid measuring errors which might be caused by variations in the intensity of the light source employed by providing a reference signal and forming a quotient between the measured signal and the reference signal.

SUMMARY OF THE INVENTION

According to the invention, there is provided an accelerometer comprising an inertia mass and a device for measuring the force effective on the inertia mass, including a prism which receives the light from a light source and which is capable to provide a total reflection. The prism is arranged to extend alongside a light conducting or light absorbing body, whereby a narrow gap is formed between one boundary surface of the prism and said light conducting or light absorbing body, such gap having a width corresponding to a few wave lengths of the light passing through the prism. The width of the gap is variable by a force effective on the inertia mass. Further, means are provided for measuring the intensity of the light emanating from the prism or from the light conducting or light absorbing body, whereby such measured light constitutes a direct indication of the size of the acceleration force to be measured. The inertia mass may be operatively connected either to the prism or to said light conducting or light absorbing body.

The present invention makes use of the so called "Goos-Haehnchen" effect which is known in optics. According to said effect, light defraction occurs at the boundary zones of a finite, extended wave field when total reflection takes place at the boundary surface between an optically denser medium and an optically less dense medium, whereby a transfer of energy into the optically less dense medium is effected. Such energy travels as a surface-wave parallel to the boundary surface and at a spacing corresponding to several wave lengths from the optically denser medium through the optically less dense medium. The energy then returns into the optically denser medium at the opposite boundary zone of the wave field, whereby a total energy reflection is accomplished.

If a body capable of detouring or absorbing the surface wave approaches in the optically less dense medium toward the boundary surface of the optically denser medium, the total reflection is disturbed. Such disturbance increases with the increasing proximity of the light conducting or light absorbing body relative to said boundary surface between the optically denser medium and the optical less dense medium. Thus, a modulation of the light reflected in the optically denser medium is possible, for example, by elastic deflections or displacements of a body located at a slight spacing from said boundary surface, said spacing corresponding to a few wave lengths of the light. Said elastic deflections or displacements may be caused by inertia forces effective on a mass arranged for such cooperation with said body as taught by the present invention.

The optical and mechanical elements used according to the invention in the present accelerometer are substantially less sensitive against aging and temperature variations than piezoelectric elements. This feature may be further improved by especially selecting the materials with due regard to their temperature characteristics. Thus, materials may be selected which compensate for any temperature expansions or which have a temperature compensated elasticity coefficient.

The above described effect which is utilized according to the invention, may be amplified by employing a prism having two reflecting surfaces arranged opposite each other. In this manner multiple reflections occur at these reflecting surfaces, whereby also a multiple deflection or absorption of the light is accomplished.

In order to avoid measuring errors which may be caused by fluctuations in the intensity of the light emitted from the light source, it is especially advantageous to produce according to the invention, a reference signal and to equip the present accelerometer with a device for measuring the intensity of the light source as well as the reference signal, whereby the measured signal is compared with the reference signal, for example, by forming a quotient of the two signals to thus make the measured signal independent of the instantaneous intensity of the light source.

BRIEF FIGURE DESCRIPTION

In order that the invention may be clearly understood, it will now be described, by way of example, with reference to the accompanying drawings, wherein:

FIG. 1 is a sectional view through one embodiment of an accelerometer according to the invention, whereby the section extends along the longitudinal axis of the accelerometer and wherein a single reflection of the light is utilized;

FIG. 2 illustrates a partial view of a further embodiment according to the invention, with the section extending as in FIG. 1, however, employing multiple light reflections; and FIG. 3 is a further embodiment according to the invention, wherein a reference signal and a measured signal are produced.

DETAILED DESCRIPTION OF PREFERRED EXAMPLE EMBODIMENTS

FIG. 1 illustrates one example of an accelerometer according to the invention, wherein a light source 8 is connected to an electrical power supply 15. The light source may, for example, be a luminescent or light emitting diode which transmits its light through a lens 6 forming a bundle of parallel light beams. A disc shutter 13 is arranged to convert the parallel light beams into an annular bunch of light beams which enters into a prism 5 perpendicularly to its surface facing the lens 6. The light is reflected at the surface of the prism forming the hypotenuse of the prism 5, whereby the angle of incidence is such that a total reflection is assured. The reflected light exits at a right angle from the prism to be collected by a lens 7 which directs the light onto a photosensitive element 9 which provides an electrical signal at its output terminals 16. This electrical signal is proportional to the received signal which is proportional to the acceleration.

The present accelerometer further comprises a light conducting or light absorbing body 3, for example of glass arranged relative to the hypotenuse surface of the prism 5 to form a slight gap 4 having a width of, for example, three times the wave length of the light involved. The body 3 is subject to the movements of an inertia mass 1 which responds to inertia forces. The prism 5, the body 3, and the inertia mass 1 are arranged in a housing 12 closed by a cover 11. Between the cover 11 and the inertia mass 1 there is arranged a Belleville spring 10 which normally urges the mass 1 against the body 3. A metal plate 2 may be arranged between the lower end of the mass 1 and the body 3 for uniform force distribution.

The gap 4 is formed by means of a spacer ring 19 which may be vapor deposited on the surface of the body 3, for example, of glass. The ring 19 has a thickness of a few microns corresponding to the width of the gap and the body 3 may be secured to the hypotenuse surface of the prism 5 by an adhesive 17. The gap 4 may be filled with air or nitrogen having a smaller index of refraction than the glass of the prism 5. Energy passes along the boundary zone between the hypotenuse surface of the prism 5 and the optically less dense medium in the gap 4. The quantity of energy entering into the gap 4 depends on the width of the gap 4 which, according to the invention, is variable in response to the inertia forces effective on the mass 1 which presses through the plate 2, for example, made of a hard material such as steel, onto the body 3, whereby deflections of said body or elastical deformations of said body vary the width of the gap. With increasing inertia forces the gap becomes smaller and more light passes into the body 3. This light proportion thus diminishes the total reflection and the photo voltage at the output 16 of the photocell 9 is reduced accordingly.

On the other hand, where the inertia mass 1 is biased by the spring 10 as shown in FIG. 1, the width of the gap increases as the pressure caused by the inertia forces is decreased due to reduced or reversed inertia forces, whereby less energy is removed from the total reflection and accordingly, the photo-voltage at the output 16 increases. According to the invention it is especially advantageous to provide a defined zero point of acceleration, which may be accomplished by the Belleville spring 10, which permits the above mentioned biasing of the inertia mass 1 held in the housing 12 by the bottom 12' and the cover 11 secured to the housing by conventional means not shown. The biasing force of the spring 10 should be relatively large to the occurring inertia forces in order to keep the displacement of the inertia mass 1 in the range of microns.

FIG. 2 illustrates another embodiment according to the invention, wherein the housing has been omitted for simplicity's sake. In this embodiment, the gap 4 is again formed between the prism 5 and the light conducting body 3, however, the latter is arranged opposite the inertia mass 1 relative to the prism 5. The inertia mass 1 is effective on the relatively thin prism 5 of FIG. 2 through an intermediate transition plate 2 also, for example, of hard steel or the like and the prism 5 is provided with a mirror reflecting surface 51 facing said plate 2. The gap 4, as mentioned, is again formed by a spacer ring 19 and the adhesive 17 between the glass body 3 and the prism 5.

The light emitting from the light source 8 is bunched or focused through an apertured shutter 18 and by a lens 18' forming part of the light emitting diode 8. The apertured shutter 18 may, for example, be vapor deposited on the respective surface of the prism 5. Due to the fact that the prism 5 in FIG. 2 is of relatively narrow width, several reflections are accomplished inside the prism 5 as shown in FIG. 2 so that more than one reflection zone coincides with the range of the gap 4. As in FIG. 1, the light energy entering into the glass body 3 in FIG. 2 is modulated by the inertia forces effective on the inertia mass 1 and such modulation is sensed by the photocell 9 providing a respective electrical output signal at its output terminals 16.

FIG. 3 illustrates a third embodiment of an accelerometer according to the invention, wherein in addition to the means for measuring the light intensity influenced by the inertia forces, means are provided for generating a reference signal based on a fixed proportion of the transmitting intensity. Such reference signal is used to eliminate any errors that otherwise might be caused by fluctuations or variations in the intensity of the light emitted by the light source 8. Generally, the structure of FIG. 3 is similar to that of FIG. 2. An inertia mass 1 is biased in a housing 12 by a Belleville spring 10 against a hard plate 2 pressing against a prism 5 of relatively narrow width. The biasing force of the spring 10 is large relative to the inertia forces that may occur, for example, ten times larger than the expected inertia forces. The hard plate 2 is arranged inside the housing 12 with a suitable fit and presses onto the disc shape prism 5 in the form of a glass plate having a prismatic longitudinal section. The plane surfaces of this prism 5 in FIG. 3 are mirror coated except for a disc shaped area centrally of the prism 5. Said disc shaped central area on the lower plane surface of the prism 5 registers with the gap 4, which is formed as described above by the spacer ring 19 and the adhesive 17. The glass body 3 which forms the other plane boundary of the gap 4 is provided in FIG. 3 with a recess 26. One side 20 of the recess 26 is also provided with a mirror coating and is held in the housing 12 with a proper fit. The cover 11 in FIG. 3 holds the glass body 3 in fixed position in the housing 12 by means of a soldering 27 or by means of an adhesive.

A first light conductor 23 extends through the cover 11 to a point in register with a stray window 30. A further light conductor 24 also extends through the cover 11 to a point in register with a stray zone 29 to be described below. Light from a source not shown is introduced into the recess 26 in the glass body 3 by means of a light conductor 22 extending through a flange in the housing 12 and into register with an aperture 21 through the housing 12 to permit the light to enter on the one hand into the recess and on the other hand through a narrow portion 25 of the body 3 into the disc prism 5. The aperture 21 is sufficiently narrow to provide a beam of light, a portion of which is reflected to enter through the stray window 30 into the light conductor 23 for the formation of a reference signal. The outer portion of the light entering through the light conductor 22 enters through the narrow part 25 of the body 3 into the prism 5, as mentioned where it is reflected several times. In the gap area 4 the proportion of the energy entering into the glass body 3 will again depend on the size of the inertia force and this proportion enters through the stray zone 29 into the light conductor 24 for producing a measured signal, for example, by means of a photocell as described. The stray zone 29 may, for example, be formed by roughening the surface of the glass in the area of the conductor 24.

The arrangement of FIG. 3 has the advantage that by forming the quotient of the measured light signal E and the reference signal R it is possible to eliminate any intensity variations or fluctuations of the input light signal S. Thus, the measured value becomes independent of the intensity of the light signal S emitted by a light source and emanating from the light conductor 22.

Although the invention has been described with reference to specific example embodiments, it will be appreciated, that it is intended to cover all modifications and equivalents within the scope of the appended claims.

What is claimed is:

1. An apparatus for measuring acceleration comprising housing means, inertia mass means in said housing means, force measuring means operatively arranged in said housing for responding to acceleration forces effective on said inertia mass means, said force measuring means comprising light source means, prism means having light reflecting surfaces arranged in said housing means to totally reflect light received from said light source means, body means operatively arranged with a spacing relative to one of said light reflecting surfaces of said prism means and so as to vary said spacing in response to said acceleration forces effective on said inertia mass means, and light intensity measuring means operatively arranged to receive light reflected by said prism as influenced by said variable spacing, whereby the measured light intensity provides an indication of the size of said acceleration forces.

2. The apparatus of claim 1, wherein said body means is light conducting.

3. The apparatus of claim 1, wherein said body means is light absorbing.

4. The apparatus of claim 1, wherein said light reflected by said prism is received directly by said light intensity measuring means.

5. The apparatus of claim 1, wherein said body means is light conducting and arranged between said prism means and said light intensity measuring means, whereby said light reflected by said prism passes through said body means for reaching said light intensity measuring means.

6. The apparatus according to claim 1, further comprising means operatively connecting said inertia mass means and said body means.

7. The apparatus of claim 1, further comprising means operatively connecting said inertia mass means and said prism means.

8. The apparatus of claim 1, wherein said prism means comprise two reflecting surfaces one arranged opposite the other.

9. The apparatus of claim 1, further comprising in addition to said light intensity measuring means, means for producing a reference signal which represents a proportion of the reflected light.

* * * * *